United States Patent [19]

Payne et al.

[11] 4,403,874
[45] Sep. 13, 1983

[54] COLOR PRINTER AND MULTI-RIBBON CARTRIDGE THEREFOR

[75] Inventors: Errol G. Payne, Irvine; Charles D. McGregor, Santa Ana; Tim M. Uyeda, South San Gabriel, all of Calif.

[73] Assignee: Ramtek Corporation, Santa Clara, Calif.

[21] Appl. No.: 133,889

[22] Filed: Mar. 25, 1980

[51] Int. Cl.³ ............................................. B41J 33/14
[52] U.S. Cl. ........................................ 400/124; 400/82; 400/157.3; 400/196.1; 400/206; 358/78; 358/303
[58] Field of Search ................. 400/82, 118, 119, 120, 400/121, 124, 126, 157.3, 161.1, 166, 194, 195, 196, 196.1, 206, 208, 257; 101/93.04, 93.05; 358/75, 78, 127, 296, 298, 300, 303

[56] References Cited

U.S. PATENT DOCUMENTS

| | | | |
|---|---|---|---|
| Re. 27,555 | 1/1973 | Loughren | 358/78 |
| 2,951,894 | 9/1980 | Hirsch | 358/75 |
| 3,135,828 | 6/1964 | Simjian | 358/75 |
| 3,476,874 | 11/1969 | Loughren | 358/75 |
| 3,523,158 | 8/1970 | Zaphiropoulos | 358/75 |
| 3,564,120 | 2/1971 | Taylor | 358/75 |
| 3,592,311 | 7/1971 | Chou | 400/124 |
| 3,596,594 | 8/1971 | Ukitsu et al. | 400/161.1 X |
| 3,617,623 | 11/1971 | Ross | 358/75 |
| 3,660,547 | 5/1972 | Stock | 358/80 |
| 3,672,482 | 6/1972 | Brumbaugh et al. | 400/124 |
| 3,675,753 | 7/1972 | Perucca | 400/257 X |
| 3,728,962 | 4/1973 | Sherrington | 400/120 X |
| 3,729,079 | 4/1973 | Zenner et al. | 400/124 |
| 3,730,975 | 5/1973 | Kono et al. | 358/75 |
| 3,745,243 | 7/1973 | Seitz | 358/78 |
| 3,747,120 | 7/1973 | Stemme | 358/75 X |
| 3,782,278 | 1/1974 | Barnett et al. | 400/124 X |
| 3,823,257 | 7/1974 | Oelmayer et al. | 358/75 X |
| 3,828,908 | 8/1974 | Schneider | 400/124 |
| 3,892,175 | 7/1975 | Heindke et al. | 101/93.05 |
| 3,904,017 | 9/1975 | Frechette | 400/208 X |
| 3,941,051 | 3/1976 | Barrus et al. | 101/93.04 |
| 3,955,756 | 5/1976 | Paton | 358/75 X |
| 3,967,714 | 7/1976 | Potma et al. | 101/93.05 X |
| 3,971,311 | 7/1976 | Deproux | 101/93.04 |
| 3,975,740 | 8/1976 | Distler | 358/75 X |
| 3,975,740 | 8/1976 | Dietler et al. | |
| 3,993,182 | 11/1976 | Steinke | 400/195 |
| 3,995,279 | 11/1976 | Weismuller et al. | 358/75 X |
| 3,995,731 | 12/1976 | Miller et al. | 400/195 |
| 4,004,505 | 1/1977 | Magnenet | 101/93.48 |
| 4,007,489 | 3/1978 | Helmberger et al. | 358/78 |
| 4,014,258 | 3/1977 | Wassermann | 101/93.48 X |
| 4,027,761 | 6/1977 | Quaif | 400/124 |
| 4,030,590 | 6/1977 | Wojdyla | 400/82 |
| 4,033,255 | 7/1977 | Kleist et al. | 101/93.04 |
| 4,044,668 | 8/1977 | Barrus et al. | 101/93.04 |
| 4,070,963 | 1/1978 | Weaver | 101/93.48 X |
| 4,077,336 | 3/1978 | Talvard et al. | 101/93.05 |
| 4,077,489 | 2/1977 | Helmberger et al. | 358/78 |
| 4,080,892 | 3/1978 | Imahashi | 101/93.04 |
| 4,091,913 | 5/1978 | Ku et al. | 400/124 |
| 4,109,282 | 8/1978 | Robertson et al. | 346/140 X |
| 4,130,367 | 12/1978 | Guerrini et al. | 400/195 |
| 4,155,229 | 5/1979 | Mitter | 400/124 X |
| 4,161,270 | 7/1979 | Casey | 400/195 |
| 4,189,246 | 2/1980 | Kane et al. | 400/166 |
| 4,204,779 | 5/1980 | Lee et al. | 400/82 X |
| 4,232,975 | 11/1980 | Kane | 400/157.3 X |

FOREIGN PATENT DOCUMENTS 11722  6/1980  European Pat. Off. ............ 400/126

OTHER PUBLICATIONS

IBM Technical Disclosure Bulletin, "Digital Color Printer", Skinner et al., vol. 21, No. 5, Oct. 1978, pp. 1828-1829.

IBM Technical Disclosure Bulletin, "Multicolor Matrix Impact Printer", Meier, vol. 21, No. 11, Apr. 1979, pp. 4448-4451.

IBM Technical Disclosure Bulletin, "Impact Force Compensation for Voltage Variations in the Hammer Firing Pulse in Impact Printer", Sweat, Jr., vol. 22, No. 5, Oct. 1979, pp. 1756-1758.

IBM Technical Disclosure Bulletin, "Two-Color Cartridge Ribbon System with Correction", Schaefer, vol. 22, No. 6, Nov. 1979, pp. 2327-2329.

IBM Technical Disclosure Bulletin, "Color Wheel Impact Printer," Dunn, vol. 22, No. 10, Mar. 1980, pp. 4364-4365.

IBM Technical Disclosure Bulletin, "Multiple Ribbon

Cartridge Color Printer", Meier et al., vol. 22, No. 10, Mar. 1980, pp. 4481-4482.
IBM Technical Disclosure Bulletin, "Color Matrix Printer", Pimbley et al., vol. 23, No. 1, Jun. 1980, p. 144.
IBM Technical Disclosure Bulletin, "Thermal Ink Transfer Color Print", Crooks et al., vol. 23, No. 7A, Dec. 1980, p. 2954.

*Primary Examiner*—Ernest T. Wright, Jr.
*Attorney, Agent, or Firm*—J. William Wigert, Jr.

[57] ABSTRACT

A color printer includes a print head assembly including a plurality of independently actuable print heads serially arranged along a printing direction. Each print head includes a plurality of impact pins and an associated different color printing ribbon having a portion disposed between the associated print head and a media to be printed upon. The serial alignment of the print heads enables four color images to be produced by a single pass of the print head assembly along the media in a printing direction. Control apparatus includes pulse modulation circuitry for controlling the impact force of each impact pin to cause intensity modulation of printed colored marks. In addition, a feedback system enables the control apparatus to vary the impact force of each impact pin to maintain good color fidelity. An ink ribbon cartridge includes a plurality of compartments with each compartment having a ribbon supply area and an associated pathway for passage of a ribbon loop exterior to the compartments, said ribbon loops being disposed in a line along a front face of the cartridge frame. Drive apparatus circulates each ribbon from the supply over to the pathways and back into the supply area during which time each ribbon is rotated 180° about a longitudinal axis thereon.

14 Claims, 9 Drawing Figures

COLOR PRINTER AND MULTI-RIBBON CARTRIDGE THEREFOR

BACKGROUND OF THE INVENTION

The present invention relates generally to the field of printers and more particularly to the field of color impact printers for producing color characters and images from video type signals or data processing computer output.

Printers for use in the data processing field commonly are either ink jet or impact types, each type having particular advantages and disadvantages. Ink jet printers "spray" a stream of fine ink droplets towards a printing media and form ink dot printing patterns thereon by deflecting the airborne ink droplets with an electric field.

A serious disadvantage of ink jet printers is the difficulty in achieving reliable operation. Because of the required small size of the ink droplets, the ink jets and associated capillary passage ways are easily clogged. In addition, the flow of ink in such printers is very sensitive to ambient temperature and humidity, as well as to shock and vibration. Ink jet printers also typically require use of special printing media formulated to be compatible with the characteristics of the ink used to prevent excessive ink droplet smearing or ink diffusion into the media.

Color ink jet printers having several independently controlled ink jets, each of a different color, have recently been made commercially available, although at substantial cost. Such printers ordinarily achieve full color printing from the several (usually four) ink jets so closely together at each printing position that the human eye perceives only a single color combination of the different deposited droplets. Alternatively, partial or complete ink droplet overlaying techniques may be used to obtain the desired color combination at each print spot.

Although being capable of providing printing in good color directly from electronically formatted information, multi-jet color ink jet printers have severe problems. This is principally because the heretofore mentioned problems associated with ink jet printers typically multiply as ink jets are added for full color printing. As a consequence, ink jet color printers tend to be relatively unreliable, requiring frequent and expensive maintenance in order to maintain good color quality. These problems, as well as high initial costs, generally limit usefulness of currently available ink jet color printers to those relatively few applications in which printing costs are relatively unimportant.

Since ink jet color printers are generally not practical in low cost applications or those in which ambient conditions cannot easily be controlled, a substantial need exists for alternative types of color printers.

Impact printers which use rotatable balls or "daisy wheels" to print an entire alphanumeric character of symbol with a single printing stroke such as typewriters and the like, are capable of good quality printed text necessary for most printed communication purposes, at moderate speeds. However, such printers are of little practical value for producing computer graphics as is frequently necessary. Additionally, mechanical complexity causes such printers to be relatively expensive to purchase and maintain.

A less common type impact printer utilizes ball point pens which are driven against a print media. This type of printer is also usually unreliable because of ink flow interruptions and overflow. And, since rolling contact is normally required to transfer ink from the pen onto the printing media, such printers are limited to line drawing applications.

Impact printers having an array of closely spaced, individually actuable impact printing pins, on the other hand are relatively inexpensive high speed printers. Selectively actuating different printing pins in the array, enables the forming virtually any alphanumeric character or symbol. Although such pin matrix printers, which print the desired characters and symbols as a series of unconnected dots or line segments do not provide the printed word quality of ball or "daisy wheel" impact printers, they are much more versatile than whole character printers, since "dot" matrix printouts of charts, graphs and images are enabled. This is a substantial advantage for data processing and video signal applications in which the desired visually reproduced output is required to be in other than text form.

Typically, color impact printers have used a single impact printing head, and a single printing ribbon having several different transverse or longitudinal colored ink zones. After a first printing "pass" on either a line-by-line or page-by-page basis, in which a first colored ink zone of the ribbon is positioned between the printing head and the printing media, a second colored ink zone of the ribbon is positioned between the head and media. A second printing "pass" is then made, the procedure being repeated until all the colors (ordinarily four) necessary to print in full color print have been printed.

Various problems are also associated with this type of color impact printing. For example, since multiple printing passes are necessary, the printing rate is relatively slow and registration of the sequential printing impacts at each printing point is difficult to achieve and maintain, particularly for other than line-by-line printing.

A further substantial problem is color contamination of various ink zones, particularly of light color areas of the printing ribbon by using only a single printing head for printing all the different colors. Thus, after the ribbon has been used only a short time, and before the ink supply on the ribbon has been depleted, printing color fidelity is significantly reduced. This effect is particularly disadvantageous in those applications, such as geophysical or topographical mapping, in which the printing colors represent important information color.

Even without color contamination, inked ribbons must be replaced periodically because of ink depletion. Since such ink depletion is gradual, color impact printers may produce faded or distorted color reproduction during a length of time preceding replacement, and because of the often difficult and messy task of replacing spool held ribbon, replacement is typically deferred until the print quality is quite poor.

SUMMARY OF THE INVENTION

As a result of these and other problems with data processing-type color printers, applicants' have invented a four color impact-type printer which uses several separate printing heads, each one of which has associated therewith a separate colored ink ribbon. Since each printing head contacts only its associated ink ribbon, printing head contamination of the ribbons is eliminated. Further, ribbon color contamination, is minimized by arranging the printing heads to print the colors in order of increasing darker hues.

In addition, the printing head impact force is controlled in order to vary the intensity of each color to enable a full spectrum of colors to be printed. Also, through the use of a feedback network, the color intensity can be monitored and adjusted to accommodate for ink depletion in the ribbons.

To facilitate ribbon replacement as well as reduce the size and weight of the printing heads, a multi-ribbon cartridge, or cassette, is provided. By incorporating all the inked ribbons into a single cartridge, structure that may be necessary for the support of separate single ribbon cartridges is eliminated, thus reducing the weight associated with the print head. Since rapid start and stop movement of the print heads may be necessary, such weight reduction is desirable to increase printer response and speed. In addition, with a single multi-ribbon cartridge, the print heads may be spaced close together thereby facilitating alignment of the print heads with each other. Such alignment is important in achieving high resolution print output.

In accordance with the present invention, an impact printer for producing color characters and drawings on a media includes a print head assembly including a plurality of independently actuable impact print heads serially arranged along a printing direction. Each print head has a different color printing ribbon associated therewith and each ribbon has a portion disposed between the associated print head and the media. By serially aligning the print heads along a printing direction, only one pass across the media is necessary to print a four color image or drawing. This significantly increases the printing speed by eliminating multiple passes of the print head past the media as is necessary for conventional-type multicolor impact printers.

In addition, means for causing relative movement between the print head assembly and the media along the printing direction and means for moving the ribbon past the associated print head are provided.

In order for each of the serially arranged print heads to sequentially mark the media at preselected positions, index means is provided and control means is provided for selectively actuating the print heads at each preselected position along the printing direction in a manner causing a preselected color combination mark thereon.

In an exemplary embodiment of the invention, means, disposed on the print head assembly, are provided for supporting a removable cartridge, having a plurality of different colored inked ribbons, in an operative relationship with the print head assembly. When the cartridge is in operative relationship with the print head assembly each separate ribbon is disposed between an associated print head and the media.

Each of the printing heads includes solenoid actuable pin means for striking the associated ribbon against the media and the control means include pulse modulation means for controlling the impact force of each printing head pin means to cause intensity modulation of the colored marks. In addition, the control means includes means responsive to a color signal for varying the impact force of each printing head pin means in order to maintain color intensity and feedback means are provided for monitoring intensity of preselected color marks and generating a color signal corresponding thereto.

The feedback means are operative to enable the control means to vary the impact force of the heads in a manner corresponding to the color intensity of printed marks, higher impact force producing colors of greater intensity. Thus it is apparent that as the inks are depleted from the individual ribbons, the control means is able to increase the impact force to maintain good color fidelity.

An ink ribbon cartridge, or cassette, is provided which includes a frame and means, disposed within the frame, for defining a plurality of compartments with each compartment having a ribbon supply area and an associated pathway for passage of a ribbon loop exterior to each compartment. The pathways are spaced apart and serially arranged to cause the ribbon loop exterior to the compartments to be disposed in a line along a front face of the frame. A plurality of separate different colored continuous ribbons are provided, with each ribbon being disposed in an associated compartment ribbon supply area and having a loop portion extending through the associated pathway.

Drive means are provided within the cartridge for circulating each ribbon from the supply area to the pathway and back into the supply area. The drive means is configured for engagement with an external drive capstan. In an exemplary embodiment of the cartridge, each ribbon supply area and associated pathway are spaced apart to enable a printing head to be disposed therebetween. In addition, means are provided for causing each ribbon to rotate 180° about a longitudinal axis thereon as the ribbon is moved from the supply area to the associated open pathway. In this manner, the ribbon life is increased because both sides of the ribbon are utilized and continually reversed to permit marking from both sides of the ribbon.

BRIEF DESCRIPTION OF THE DRAWINGS

The foregoing and other features and advantages of the present invention will appear from the following description when considered in connection with the accompanying drawing, in which.

DESCRIPTION OF THE PREFERRED EMBODIMENTS

Figure 1:
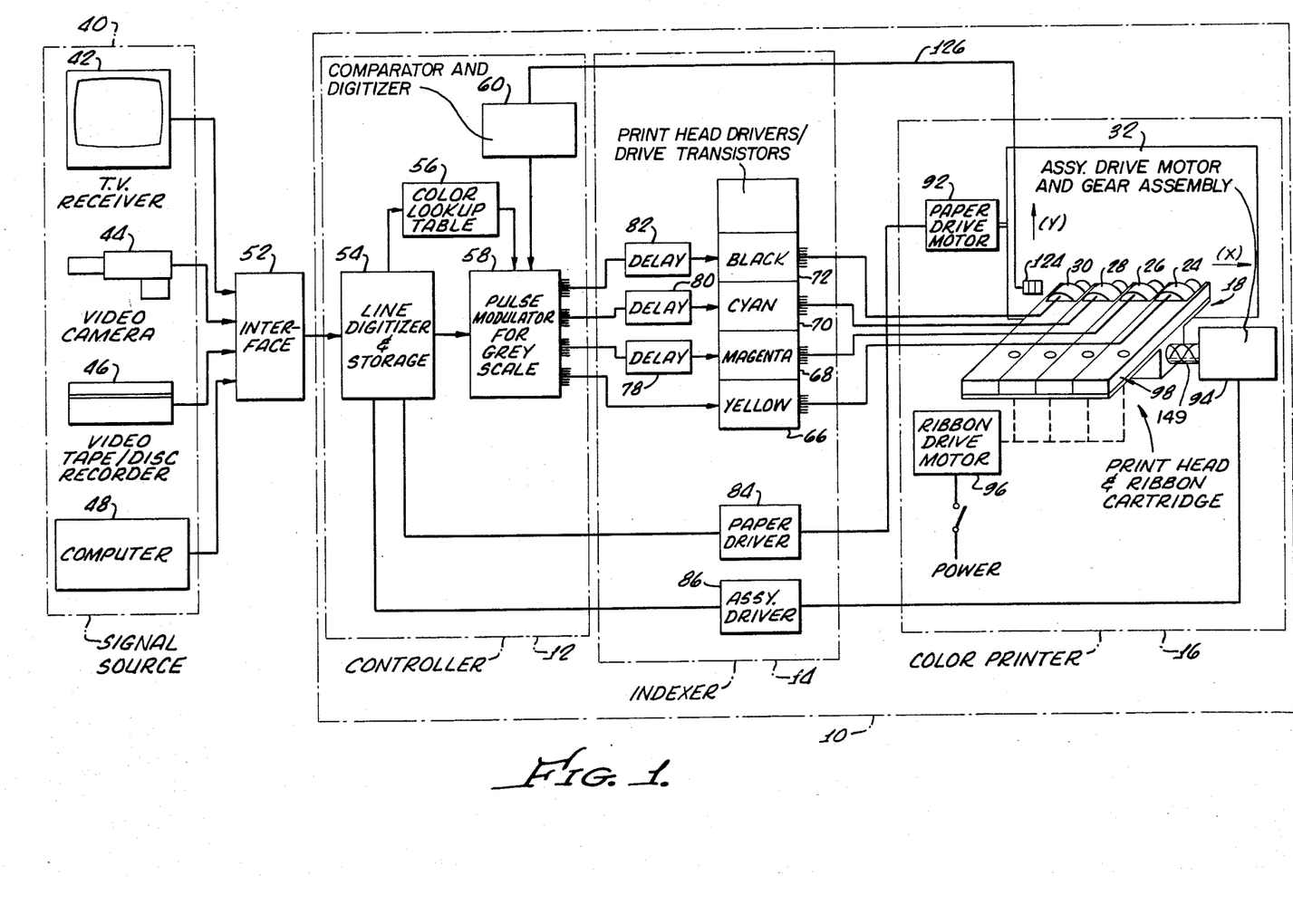
FIG. 1 is a diagram, partially in block form, of the impact printer generally showing a controller, an indexer and a print head assembly; also shown, although not part of present invention, are a signal source and an interface coupled between the signal source and the impact printer.

Turning now to FIG. 1, there is shown in diagram form, an impact printer 10 in accordance with the present invention, which generally includes a controller 12, an indexer 14 and a printer mechanism 16 including a print head assembly 18, having four print heads 24, 26, 28, 30, for producing colored marks on a printing media 32 which may be, for example, common paper, fabric, or plastic.

Also shown in FIG. 1, are a number of signal sources 40 from which the impact printer 10 may receive information to be displayed in character and/or graphic form. These signal sources 40 may include, for example, a television receiver 42, a video camera 44, a video tape/disc recorder 46 or a computer 48.

Interconnected between the signal source 40 and the impact printer 10 is an interface 52. The interface 52, which is not part of the present invention, may be of any type suitable for accepting signals from the signal sources 40 and generating corresponding input signals to the controller 12 which are compatible therewith.

The controller 12 generally includes a line digitizer 54 with data storage capability, color assignment circuitry 56, a pulse modulator 58 and comparator 60. The line digitizer 54 may be a state of the art analog-to-digital convertor for receiving a video type signal and producing a digital signal corresponding thereto. As will be subsequently discussed in greater detail, the controller 12 functions to selectively actuate the print heads 24, 26, 28, 30, at preselected positions along a printing direction, X (FIG. 1) in a manner causing a preselected colored combination mark on the media 32. The pulse modulator 58 is operative for controlling the impact force of each print head 24, 26, 28, 30, to cause intensity modulation of the colored marks.

Output from the controller 12 is received by the indexer 14 which generally includes print head drivers 66, 68, 70, 72, for driving each of the print heads 24, 26, 28, 30,respectively; delay circuits 78, 80, 82; a media, or paper, driver 84; and a print head assembly driver 86. As will be hereinafter discussed in greater detail, the indexer 14 is operative for driving the print head assembly 18 and the media 32, in a coordinated manner to index each print head 24, 26, 28, 30, thus enabling the controller 12 to sequentially mark the media 32 with each print head 24, 26, 28, 30 at preselected positions.

Also shown in FIG. 1 are a media, or paper, drive mechanism 92 responsive to the driver 84, a print head assembly drive mechanism 94 responsive to the assembly driver 86, and a ribbon drive mechanism 96 interconnected with a ribbon cartridge, or cassette, 98 for moving inked ribbons 100, 102, 104, 106, (FIG. 2) past the print heads 24, 26, 28, 30, respectively.

Figure 2:
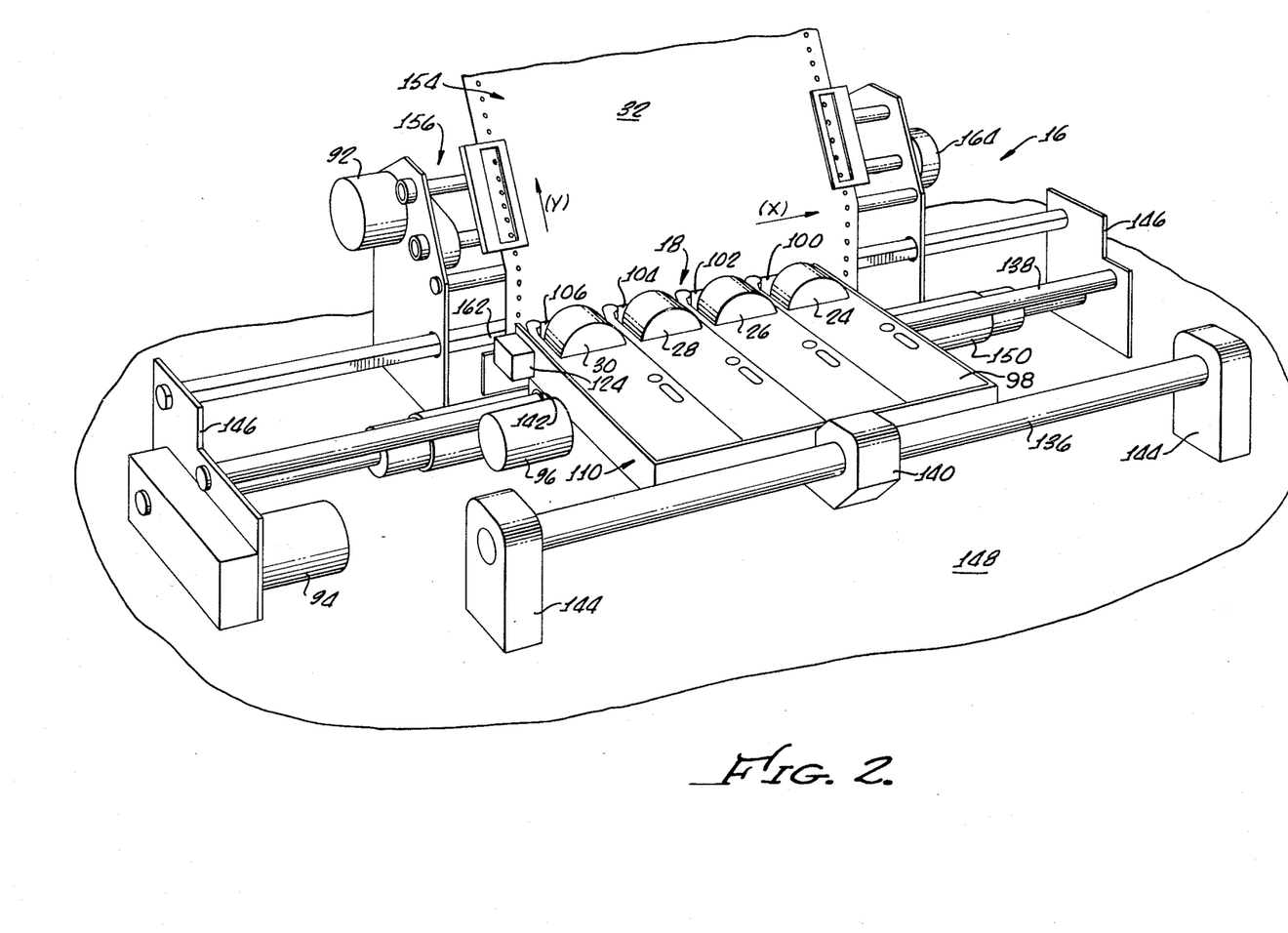
FIG. 2 is a perspective view of the print head assembly and a four color ribbon cartridge in an operative relationship therewith and generally showing four independently actuable impact print heads serially arranged along a printing direction, apparatus for moving the print head assembly relative to a printing media along the printing direction, and apparatus for moving the media in a media advancing direction.

As more clearly shown in FIG. 2, the print head assembly 18 generally includes the four print heads 24, 26, 28, 30, interconnected by a frame 110 with said print heads being serially arranged along a printing direction X.

As hereinbefore mentioned, the utilization of a unitary four ribbon cartridge 98 may enable the print heads 24, 26, 28, 30, to be disposed in closer proximity with one another by the frame 110. It is apparent that such close spacing between the print heads 24, 26, 28, 30, may enable exact alignment of the print heads 24, 26, 28, 30 along the printing direction, X, in order that the print heads 24, 26, 28, 30 may precisely impact the media 32 at the same preselected positions thus enabling production of quality color printing with high resolution.

Figure 7:
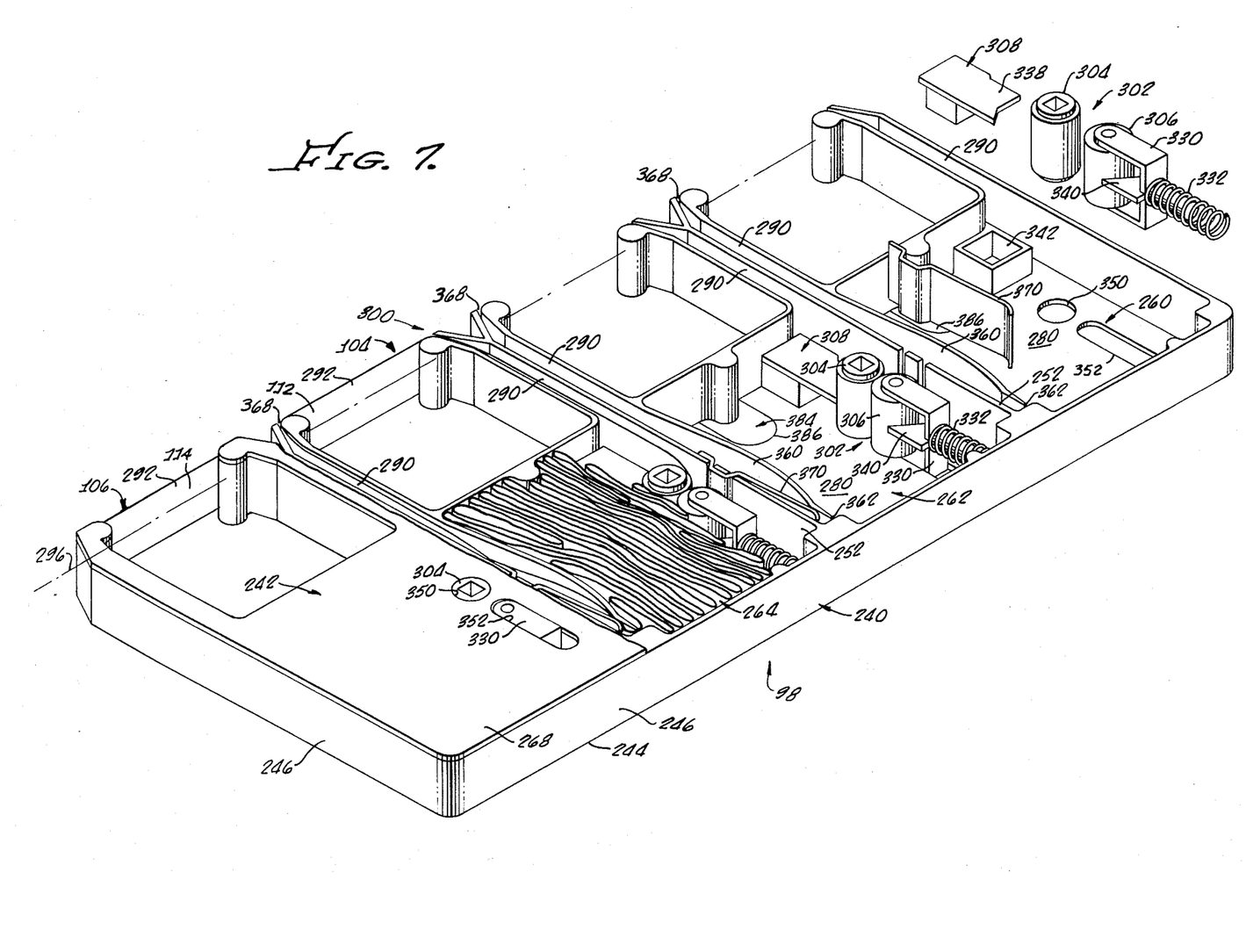
FIG. 7 is a perspective view of the four color cartridge partially broken away and exploded to more clearly show internal features of the cartridge which include drive apparatus, ribbon supply areas and spaced apart pathways serially arranged to enable passage of the ribbon loops along a front face of the cartridge.

Each ribbon 100, 102, 104, 106, is inked with a selected different color and has a loop portion, disposed between the associated print heads 24, 26, 28, 30, and the media 32. In FIG. 7, the loop portions 112 and 114 are illustratively shown for ribbons 104 and 106 respectively.

Disposed on the print head assembly 18 is a color sensitive photo cell 124, or the like, for monitoring the intensity of preselected color marks and generating a color quality signal corresponding thereto which is directed to the comparator and digitizer 60 by a feedback line 126 (FIG. 1). As will be discussed subsequently in greater detail, the controller 12, via the comparator and digitizer 60 and the pulse modulator 58, is responsive to the color signal for varying the impact force for each print head 24, 26, 28, 30, in order to maintain color intensity.

The print head assembly 18 is slidably mounted on support rods 136, 138, by means of a guide 140 and a bearing 142, respectively, fixed to the frame 110. The rods 136, 138, are in turn supported by members 144, 146, respectively, fixed to a suitable printer base 148.

Movement of the print head assembly 18 is enabled by a helical-type gear 149, or the like, disposed between the members 146 and engaging the print head frame 110 in a conventional manner, bidirectional movement being caused by the assembly drive motor and gear assembly 94.

As previously mentioned, movement in the direction of the Arrow X is in a printing direction. By selecting the ribbons 100, 102, 104, 106, to be inked the colors yellow, magenta, cyan and black, respectively, the printing sequence along the printing direction X is from light to dark hues thereby reducing the amount of color contamination which may occur because of repeated striking of preselected positions by different colored ribbons as a color combination mark is made.

After each printing pass across the media 32, the assembly 18 is returned to a side 154 of the media 32 and the media 32 advances along a media advancing direction Y by the drive motor 92 which may be coupled therewith by convention paper transport apparatus 156, (FIG. 3) which may include a drive belt 158, media engaging drive wheels 160 and a suitable platen 162 disposed adjacent the print head assembly 18 for supporting the media 32. As is customary, a manual paper advance apparatus 164 (FIG. 2) may be provided to be used as necessary.

Figures 3, 4A, 4B, 4C:
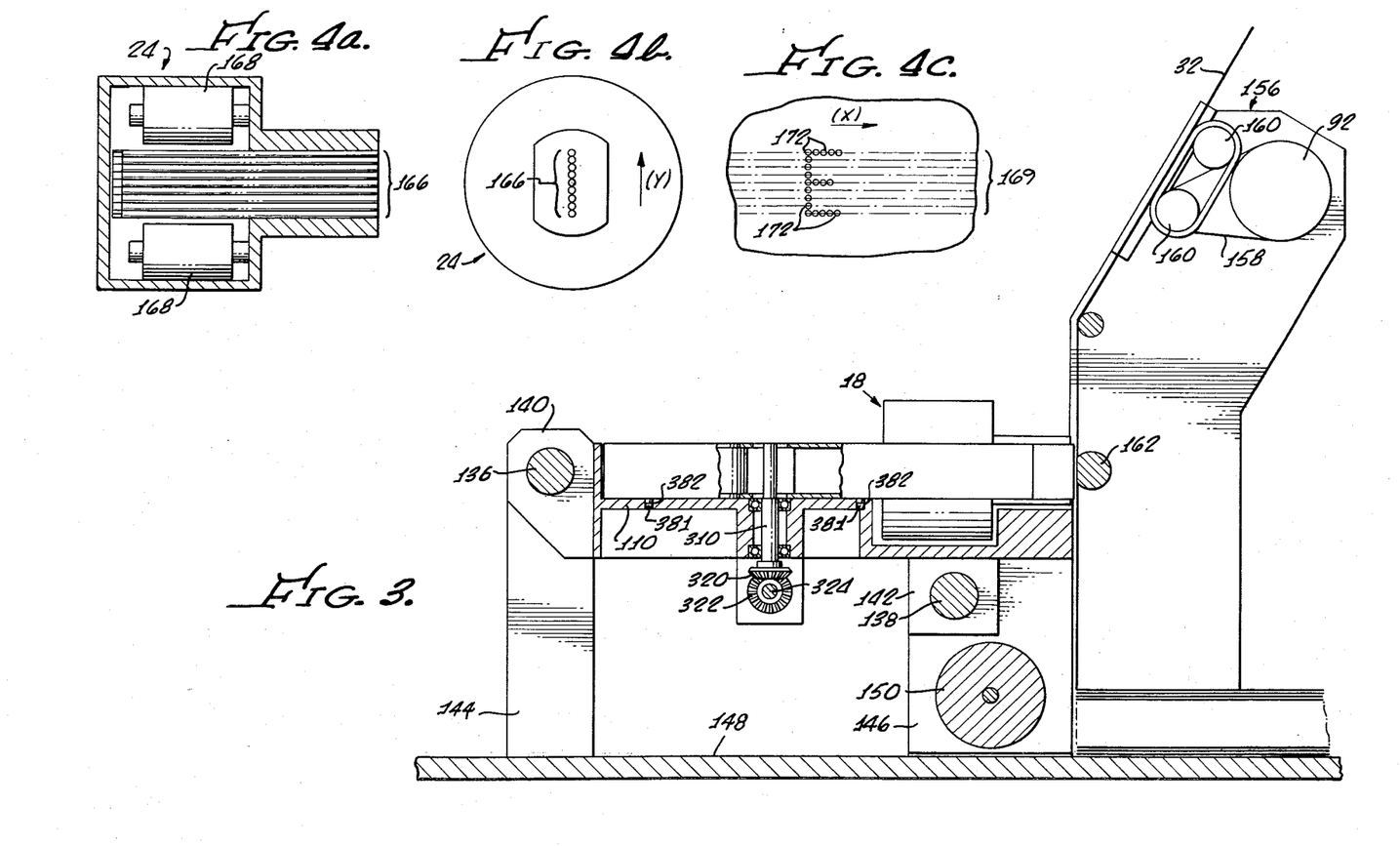
FIG. 3 is a cross sectional view of the print head assembly and the cartridge showing the cartridge in an operative relationship with the print head assembly and apparatus for circulating the ribbons within the cartridge and ribbon loop portions past associated printed heads.
FIG. 4a is an enlarged cross sectional view of a printing head generally showing nine independently actuable impact pins and solenoids for causing movement of the impact pins.
FIG. 4b and 4c, taken together, show the alignment of the impact pins with respect to the printing media and the paths followed by the printer pins along the media as the print head assembly is moved across the media in a printing direction.

The print heads 24, 26, 28, 30, are preferably nine pin print heads commercially available from Epsilon of America, Inc., of Torrance, Calif., or Victor Inc. of Chicago, Ill., (FIG. 4a). Each of the pins 166 are individually actuable by means of a solenoid 168 and the pins 166 are aligned along the direction Y (FIG. 4b). As shown in FIGS. 1, 2 and 3, the print heads 24, 26, 28, 30, are serially arranged along the printing direction X so that each of the pins 166 move along parallel paths 169 (FIG. 4c). Because the pins 166 are aligned to move along paths 169 in the X direction, selective actuation of the pins 166 along the printing direction X enables each of the pins 166, along a path 169, to strike preselected positions 172. Combination of the preselected positions 172 enables the pins 166 to produce alphanumeric characters, for example, the letter E shown in FIG. 4c, or any image formable by a dot combination. Overmarking, or overprinting, by each of four print heads 24, 26, 28, 30 through associated different color ribbons 100, 102, 104, 106, at each preselected position 172, enables color combination marks to be produced.

Using a pin 166 diameter of approximately 0.014 inch and precise alignment of the print heads 24, 26, 28, 30, along the X direction, as may be enabled by closely spaced print heads, the resolution of the printer 10 may be approximately the same as the electron beam spread on a twelve inch color television receiver.

It is important that each of the print heads 24, 26, 28, 30, have a separate printing ribbon 100, 102, 104, 106, respectively, associated therewith in order that each of the print heads 24, 26, 28, 30 strikes the media 32 through a single ribbon 100, 102, 104 or 106. This substantially reduces the possibility of contamination of each head 24, 26, 28, 30 with different colors, and because each head 24, 26, 28, 30 had its own ribbon 100, 102, 104, 106 respectively, the mechanical transport problems associated with utilizing multicolored ribbons, or a set of ribbons all drawn past all the heads, is eliminated.

A remaining possible mode of contamination of the heads 24, 26, 28, 30 with different color is the "picking up" of color from the media 32 as the heads 24, 26, 28, 30 sequentially mark the same spot to cause color combination thereon.

To reduce this type of contamination, the printing sequence may be: yellow, magenta, cyan and black. This results from the knowledge that yellow colors are most sensitive to contamination and black the least.

To further reduce contamination of the colors, it is preferable that the individual dye solvents, or bases, be immiscible. The dyes may be of analine type and may be suspended or dissolved in glycol or oil solvents as is well known in the art and described, for example, in "Henley's Twentieth Century Book of Formulas" published by Books Inc., 1968, or "Material and Printing Processes" published by Hastings House, 1973.

Referring again to FIG. 1, the line digitizer 54 operates in a conventional manner to produce a digital signal which corresponds to a point-by-point analysis, or breakdown, of the input signal along a line with each point, corresponding to a particular color. Coupled with the line digitizer 54 is color assignment circuitry 56, which may be a storage device well known in the art, for determining the hue and intensity of a particular color and assigning a "gray scale" intensity level to each color. The range of intensity may be, for example, sixteen levels. In other words, the color assignment circuitry 56 functions to assign for each color a value from zero to fifteen pending upon the intensity of the color desired for transmission to the pulse modulator 58.

The color assignment circuitry 56 may also function in other modes of operation such as, for example, modifying the actual inputted color in order to change the hue of any particular color as inputted by one of the signal sources 40, or, alternatively, producing false colors in order to display, in color, inputted black and white information. In this latter mode of operation, a color rendition may be reproduced by the printer mechanism 16 in accordance with a preselected assignment of selected colors to the "gray scale" level of the inputted signal. All of these functions are well known in the art.

The intensity level in accordance with the color assignment circuitry 56 is inputted to the pulse modulator 58 which in turn produces a signal proportional to the intensity of impact required by the print heads 24, 26, 28, 30 in order to produce a preselect color intensity for each of the preselected colors.

The pulse modulator 58 functions to control the energy delivered to each of the individual print heads 24, 26, 28, 30, through the associated print head drivers 66, 68, 70, 72, respectively, and may do so by controlling either the voltage, the current, or the duration of an electrical pulse for actuating each of the print heads solenoids 168.

Figure 5:
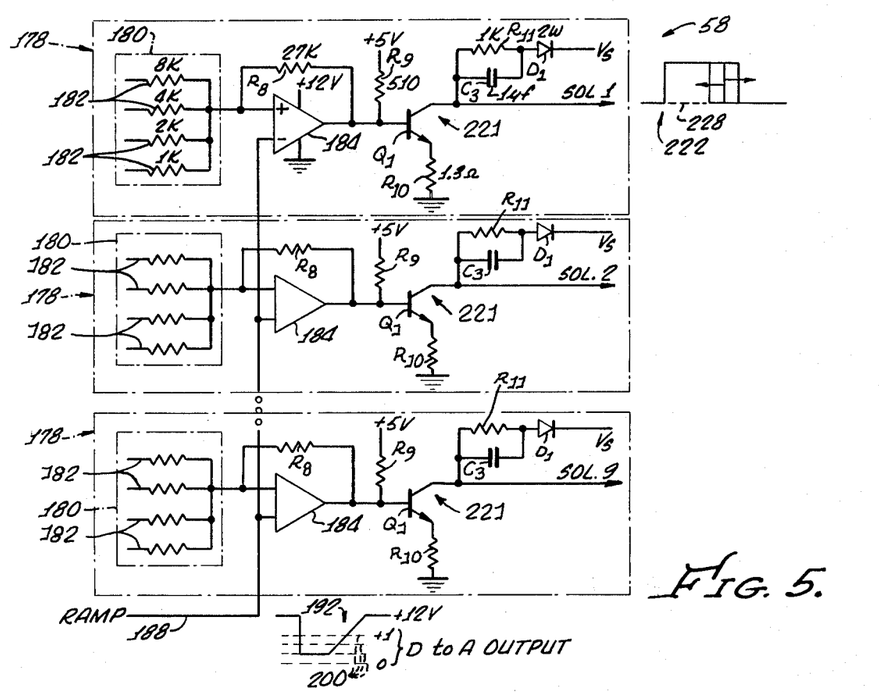
FIGS. 5 and 6, taken together, are a schematic diagram of a pulse modulator for controlling the impact force of each printing head impact pin to cause intensity modulation of colored mark formed on the media, and generally showing individual pulse generators used for each impact pin, only three of the identical generators being shown for clarity of presentation.
Figure 6:
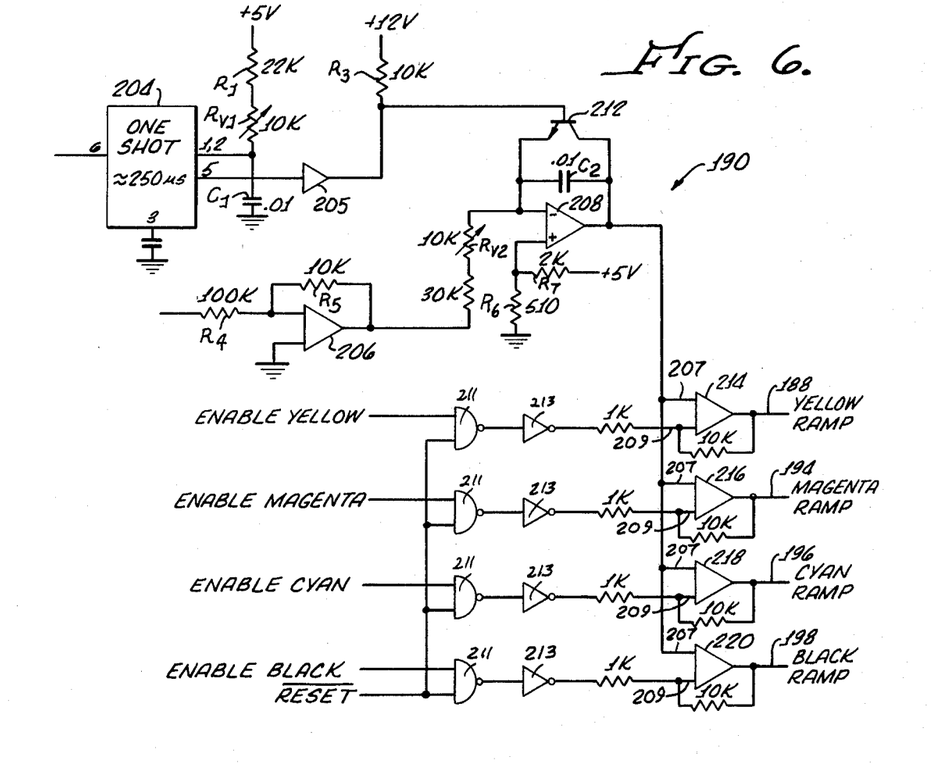

Preferably the pulse modulator 58 controls the energy by varying the duration of the electrical pulse, or pulse width, transmitted to each of the print head solenoids 168. A circuit diagram of the pulse modulator 58 is shown in FIGS. 5 and 6. Since each impact pin 166 (FIGS. 4a, 4b) of the print heads 24, 26, 28 and 30 is actuated by a separate solenoid 168, a separate pulse modulator circuit for each solenoid 168 is preferred. Hence, it is important that such circuitry be relatively simple and inexpensive in order to provide dependable and economical operation of the printer 10. As shown in FIG. 5, for one exemplary color, the pulse modulator 58 may include nine pulse generators 178 each including a digital-to-analog (D/A), convertor 180 which may consist of a number of resistors 182.

It should be appreciated that for clarity of presentation, FIG. 5 shows pulse width generators 178 for one of the color print heads 24, 26, 28, 30 only, and only three of nine pulse width generators 178 necessary for the nine pins 166 are shown. Each D/A convertor 180 may be interconnected with a comparator 184 which may be of a commercially available type LM339. Associated with comparator 184 is resistor R8.

Also connected with each comparator 184 through a line 188 is a ramp genertor 190, (FIG. 6), for providing a ramp waveform 192. The ramp generator 190 provides a separate output, 188, 194, 196, or 198, for each pulse width generator 178. As indicated on the ramp waveform 192, (FIG. 5), the voltage of the ramp may vary from +1 to ±12 volts. The dashed lines 200 superimposed on the ramp waveform 192 represent the voltage output of the D/A convertors 180. The pulse output 222 is provided by an output stage comprising resistors $R_9$, $R_{10}$, and $R_{11}$, transistor $Q_1$, diode $D_1$ and capacitor $C_3$.

The ramp generator 190 includes a "one shot" device 204 which may be a type 556 (approximately 250 microseconds) having associated circuitry including resistors $R_1$ and $RV_1$ and a capacitor $C_1$, interconnected through a buffer 205 and resistor $R_3$ as shown in FIG. 6 with a pair of operational amplifiers (Op-amps) 206, 208 of type LM348 and transistor 212 which may be of type 2N3904 or 2N3906. Associated with op-amp 206 are resistors $R_4$ and $R_5$. Associated with op-amp 208 are resistors $R_6$, $RV_2$ and $R_7$, and capacitor $C_2$. The output of the Op-amp 208 is in turn fed into one input 207 output Op-amps 214, 216, 218, 220, each having outputs 188, 194, 196, 198, respectively, corresponding to the print heads 24, 26, 28, 30, having inked ribbons 100, 102, 104, 106 of the colors, yellow, magenta, cyan and black, respectively, associated therewith. Fed to the other input 209 of op-amps 214, 216, 218, and 220 are, respectively, the enable yellow, magenta, cyan and black enable signals, via NAND gate 211 and inverter 213.

For clarity of presentation, the purpose and function of each and every component as included in the drawing are not specifically enumerated but, are presented with sufficient identification as to component type and interconnection to enable any person skilled in the art to both understand and recreate the electronic system as therein presented.

In operation, the ramp generator 190 (FIG. 6) produces a ramp signal or waveform 192 at the output of the Op-amps 214, 216, 218, 220. The Op-amps 214, 216, 218, 220, operate to disenable the pulse generator 178 fed individual solenoids 168 if the particular color is not to be operated for a particular color imprint, the output of the Op-amps 214, 216, 218, 220, being fed to the comparators 184 via the lines 188, 194, 196, 198. The signal from the D to A convertor 180 corresponding to color intensity as determined by the color look up table in circuitry 56 table and the line digitizer 54 is compared with the ramp signal or waveform 192 resulting in a pulse output 222 to each of the solenoids 168 which has a width dependent upon color intensity. The pulse width variation may be from approximately 300 to approximately 550 microseconds.

As hereinbefore mentioned, if the partucular color is not required, the pulse is disenabled so as to conserve power and the output of the pulse modulator 58 stays along a zero line 228.

Returning now to FIG. 1, the indexer 14 generally includes the print head drivers 66, 68, 70, 72, and a paper driver 84 and a print head assembly driver 86.

As the module head assembly 18 is driven across the paper 32 by the assembly motor 94, the print head drivers 66, 68, 70, 72 which include a series of power drive transistors (not shown) are operative for actuating each of the pins 166 of each color module in response to the control pulses 222 from the pulse modulator 58. The print head assembly 18 may be moved at approximately 16 inches per second and the controller 12, through the indexer 14, may operate to produce approximately 60 dots per inch along the paper 32 in the printing, or X, direction.

As is typical with conventional print head operation, solenoid actuation for a period of 600 microseconds (i.e., a drive pulse 222 having a width of 600 microseconds) produces a paper contact of approximately 200 microseconds, the difference in pulse duration and impact duration being caused by electromechanical response time.

Delay circuitry 78, 80, 82 enables each print 24, 26, 28, 30 head to sequentially mark the paper 32 at preselected positions along the printing direction X. The delay circuitry 78, 80, 82, may be of conventional design for delaying the electrical control pulses 222 from the pulse modulator 58 for a preselected period of time. Since, the print head assembly 18 moves across the media 32 at a constant speed, the delay of the pulses 222 to the print heads 26, 28, 30, having the ink ribbon colors of magenta, cyan and black associated therewith may be indexed to print on the same spot as a preceding print head 24, 26, 28, respectively.

In other words, since the print head assembly 18 may be moved across the media 32 in the direction indicated by the Arrow X and the print heads 24, 26, 28, 30, may be separated by approximately 160 dots, a delay of approximately 160 dots caused by the delay circuitry 78 interconnected between the pulse modulator 58 and the print head driver 66 causes the magenta color to be printed on the yellow color as the assembly 18 is moved across the paper 32. Similarly, the delays of 320 dots and 480 dots provided by the delay 80, 82, enable cyan and black colors to be similarly printed on the same position as the print head assembly 18 is moved across the paper 32.

As previously mentioned, the photo-type cell, or sensor, 124 fixed to the print head assembly 18 operates to monitor the color intensity of colored marks produced by the printer 10 on the media 32 and generate a color signal corresponding thereto.

The colored marks monitored may be either a "control" pattern produced by the printer 10 from a self generated or sepatate "control" input, or the colored marks monitored may be part of an output as produced by the printer 10 corresponding to an input received from the signal source 40.

Line 126 and the comparator and digitizer 60 provides a feedback of the color signal to the pulse modulator 58 in order to maintain and control color intensity of the marks. The comparator and digitizer 60 may be of conventional design and include a digitizer in order to modify the color signal from the photo cell 124 into a corresponding modified signal that can be compared with the color intensity level as produced by the color look up table in color assignment circuitry 56.

The compartor and digitizer 60 operates to compare the modified color signal corresponding to the photo cell 124 output for a selected colored mark, with the intensity level assigned by the color look up table in color assignment circuitry 56 for the selected mark and to increase or decrease the intensity level inputted to the modulator 58 for subsequent marks in order to maintain consistent color intensity of the printer 10 output.

Turning now to FIG. 7 there is shown, in greater detail, the four ribbon cartridge 98 for disposing the ribbons 100, 102, 104, 106, between the associated print heads 24, 26, 28, 30, when the cartridge 98 is placed in an operative relationship with the print head assembly 18, the cartridge 98 being shown partially broken away and the ribbons 100, 102, removed in order to better show the internal configuration of the cartridge 98.

Generally, the cartridge 98 includes an external frame 240 with a top 242, bottom 244 and sidewalls 246 and a number of upstanding interior walls 252 extending from the top 242 to the bottom 244 and defining a plurality of compartments 260, 262, 264, 268.

The compartments 260, 262, 264, 268, are each divided into a ribbon supply area 280 and an associated pathway 290 for enabling passage of a ribbon loop portion 292 exterior to each compartment 260, 262, 264, 268. The pathways 290 are spaced apart and serially arranged to cause the ribbon loops 292, exterior to the compartments 260, 262, 264, 268 to be disposed along a line 296 along a front face 300 of the cartridge frame 240. As shown in FIG. 7, each compartment 260, 262, 264, 268 includes drive apparatus 302, having a power hub 304, an idler 306, and a stripper 308, the power hub 304 being configured for engagement with a drive capstan 310 on the print head assembly 18 as best shown in FIG. 3. The capstan 310 may be driven by a bevel-type planetary gear 320 engaging a similar mating gear 322 fixed to a drive shaft 324 coupled to the ribbon drive motor 96. It should be appreciated that each of the drive capstans 310 is similarly driven by a planetary gear, not shown, coupled to the drive shaft 324 in order that the motor 96 (FIG. 2) drives all of the ribbons 100, 102, 104, 106 by the shaft 324 (FIG. 3).

Turning again to FIG. 7, the idler 306 is supported by a yoke 330 and biased against the power hub 304 by a spring 332 in order that the power hub 304 has sufficient pressure against the associated ribbon 100, 102, 104 or 106, to circulate the associated ribbon 100, 102, 104, or 106 within the respective compartments 260, 262, 264, and 268, and the pathways 290.

To prevent the ribbons 100, 102, 104, 106 which are bunched into the supple areas 280, from guiding around the power hub 304 and the idler 306, and possibly jamming the ribbon movement in the cartridge 98, the stripper 308 includes an arm 338 positioned adjacent the power hub 304 to guide the ribbons 100, 102, 104, 106, and prevent any wrapping of the ribbons 100, 102, 104, 106 about the hub 304. In addition, an idler stripper 340 may be provided to similarly prevent guiding of the ribbons 100, 102, 104, 106, about the idler 306.

As shown in FIG. 7, the stripper 308 is supported within the compartments 260, 262, 264 and by a molded receptable 342 formed in the frame bottom 244 within each compartment 260, 262, 264, 268. The power hubs 304 and the yolks 330 are positioned and held within the compartments 260, 262, 264, 268 by means of holes 350 and slots 352, respectively, cut into the cartridge top 242 and bottom 244, the slot 352 enabling sliding movement of the yoke 330 therein to enable the spring 332 to move the yoke 330 and bias the idler 306 against the power hub 304.

The inked ribbons 100, 102, 104, 106, may be coventional ½ inch wide nylon, or the like, ribbon as typically used in printing apparatus and may be inked with subtractive-type dyes of the colors, yellow, megenta, cyan and black, respectively, as hereinbefore discussed.

Each ribbon 100, 102, 104, 106, is continuous and may be formed from a flat strip of 4 mil. woven nylon material having approximately 250 threads per inch and a length as determined by the compartment size, or a determined by the amount of relative use of each color ribbon 100, 102, 104, 106 in a specific color printing application.

To extend the useful printing life of each ribbon 100, 102, 104, 106, a Mobius strip may be formed from a nylon rectangular strip (not shown) by turning one end thereon 180 degrees about a longitudinal axis thereon and attaching it to the other end as is well known. To facilitate the 180 degree turning of the ribbon 100, 102, 104, 106, as it is circulated from the ribbon area 280, through the pathway 290 and back to the supply area 280, a guide member 360 is provided in each compartments 260, 262, 264 and 268 to lead the ribbon 100, 102, 104, 106 from the supply area 280 into the pathway 290. An end 362 of the guide member 360 frictionally engages the ribbon 100, 102, 104 and 106 and creates tension in the ribbon 100, 102, 104 and 106 between the guide end 362 and the power hub 304, to enable the ribbon 100, 102, 104 and 106 to rotate 180° between the guide end 362 and an opening 368 within a pathway or channel between the guide member 360 and the wall 252 and the pathway 290 communicating therewith. In addition, a spring member 370 may be provided to create greater tension in the ribbons 100, 102, 104, 106, by urging the ribbons 100, 102, 104, and 106 against the guide end 362.

In order to properly position the cartridge 98 on the printed head assembly 18, a number of positioning pins 381 (FIG. 3) are provided which engage mating recesses 382 in the print head assembly frame 110. Additionally, a set of magnetic members 384 are received into cartridge bottom openings 386 which are positioned over the frame 110 in order to more firmly hold the cartridge 98 in position on the print assembly 18.

Although there has been described hereinabove a particular arrangement of an impact printer and multi-ribbon cartridge for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the invention as defined in the appended claims.

What is claimed is:

1. An impact printer for producing color characters and drawings on a media, comprising:
   (a) a print head assembly including a plurality of independently actuable impact print heads serially arranged along a printing direction, each print head having a different colored printing ribbon associated therewith, each ribbon having a portion disposed between the associated print head and the media;
   (b) means for causing relative movement between the print head assembly and the media along the printing direction such that each of said impact print heads is capable of impacting coextensive areas of the media;
   (c) means for moving each ribbon past the associated print heads;
   (d) a signal source for providing electronic signals which represent, on a point-by-point basis, the color content of the characters and/or drawing to be printed;
   (e) indexing means for enabling each print head to sequentially mark the media at preselected positions; and,
   (f) control means responsive to said signal source for selectively causing said indexing means to actuate the print heads at each preselected position along the printing direction depending upon the color content of said electronic signals, thereby causing a preselected colored combination marked on the media.

2. The impact printer of claim 1 wherein said plurality of print heads consists of four print heads, and wherein each of the associated colored printing ribbons is inked with subtractive-type color dyes.

3. The impact of claim 2 wherein the four different colored printing ribbons are inked with black, cyan, magenta and yellow color dyes, and said dyes are suspended in solvents which are immiscible in one another.

4. An impact printer for producing color characters and drawings on a media, comprising:
   (a) a print head assembly including a plurality of independently actuable impact print heads serially arranged along a printing direction, each print head having a separate printing ribbon associated therewith, each ribbon being of a selected different color and having a loop portion disposed between the associated print head and the media;

each print head including actuable pin means for striking the associated ribbon against the media to produce a colored mark thereon;

(b) means for causing relative movement between the print head assembly and the media along the printing direction such that each of said impact print heads can impact at the same print positions;

(c) means for moving the loop past the associated print heads;

(d) a signal source for providing electronic signals which represent, on a point-by-point basis, the color content of the characters and/or drawing to be printed;

(e) indexing means for enabling each print head pin means to sequentially mark the media at preselected positions; and, (f) control means responsive to said signal source for selectively causing said indexing means to actuate the print head pin means at each preselected position along the printing direction depending upon the color content of said electronic signals thereby causing a preselected colored combination mark on the media.

5. An impact printer for producing color characters and drawings on a media, comprising:

(a) a print head assembly including a plurality of independently actuable impact print heads serially arranged along a printing direction, each print head having a separate printing ribbon associated therewith, each ribbon being of a selected different color and having a loop portion disposed between the print head and the media, each said print head including actuable pin means for striking the associated ribbon against the media to produce a colored mark thereon;

(b) means for causing relative movement between the print head assembly and the media along the printing direction such that each of said impact print heads can impact at the same print positions;

(c) means for moving the ribbon loop portions past the associated print heads;

(d) a signal source for providing electronic signals which represent, on a point-by-point basis, the color content of the characters and/or drawing to be printed;

(e) indexing means for enabling each print head pin means to sequentially mark the media at preselected positions; and, (f) control means responsive to said signal source for selectively causing said indexing means to actuate the print head pin means at each preselected position along the printing direction depending upon the color content of said electronic signals, thereby causing a preselected colored combination mark on the media, said print head being actuated in an order corresponding to a preselected color hue sequence.

6. The impact printer of claim 5, wherein the print heads are arranged along the printing direction in an order corresponding to a preselected color hue sequence of light to dark.

7. The impact printer of claims 4 or 5, wherein the control means is further operative for controlling the impact force of each print head pin means to vary the intensity of the colored marks.

8. An impact printer for producing color characters on drawings on a media, comprising:

(a) a print head assembly including a plurality of independently actuable impact print heads serially arranged along a printing direction, each print head having a separate printing ribbon associated therewith, each ribbon being of a selected different color and having a loop portion disposed between the associated print head and the media, each said print head including actuable pin means for striking the associated ribbon against the media to produce a colored mark thereon;

(b) means for causing relative movement between the print head assembly and the media along the printing direction such that each of said impact print heads is capable of impacting the media at preselected positions;

(c) means for moving the ribbon loop portions past the associated print heads;

(d) a signal source for providing electronic signals which represent, on a point-by-point basis, the color content of the characters and/or drawings to be printed;

(e) indexing means for enabling each print head pin means to sequentially mark the media at preselected positions; and, (f) control means responsive to said signal source for selectively causing said indexing means to actuate the print head pin means at each preselected position along the printing direction depending upon the color content of said electronic signals, thereby causing a preselected colored combination mark on the media, said control means including means for controlling the impact force of each print head pin means to cause intensity modulation of the colored marks.

9. An impact printer for producing color characters and drawings on a media, comprising:

(a) a print head assembly including a plurality of independently actuable print heads serially arranged along a printing direction, each print head having a separate printing ribbon associated therewith, each ribbon being of a selected different color and having a loop portion disposed between the associated print head and the media, each said print head including actuable pin means for striking the associated ribbon against the media to produce a colored mark thereon;

(b) means for causing relative movement between the print head assembly and the media along the printing direction in a manner that permits each of said impact print heads to mark the media at the same preselected positions;

(c) means for moving the ribbon loop portions past the associated print heads;

(d) a signal source for providing electronic signals which represent, on a point-by-point basis, the color content of the characters and/or drawings to be printed;

(e) indexing means for enabling each print head pin means to sequentially mark the media at preselected positions;

(f) control means responsive to said signal source for selectively causing said indexing means to actuate the print head pin means at each preselected position along the printing direction depending upon the color content of said electronic signals, thereby causing a preselected colored combination mark on the media, said control means including means for controlling the impact force of each print head pin means to cause intensity modulation of the colored marks, and means responsive to a signal for varying the impact force of each print head in order to maintain color intensity; and (g) means for monitoring the intensity of preselected color marks and generating a signal corresponding thereto.

10. An impact printer for producing color characters and drawings on a media, comprising:
(a) a print head assembly including a plurality of independently actuable impact print heads serially arranged along a printing direction;
(b) means, disposed on the print head assembly, for supporting a removable cartridge having a plurality of separate different colored inked ribbons, in an operative relationship with the print head assembly, each separate ribbon being disposed between an associated impact print head and the media when the cartridge is in an operative relationship with the print head assembly;
(c) means for causing relative movement between the print head assembly and the media along the printing direction such that each of said impact print heads is capable of impacting over coextensive areas of the media;
(d) capstan means, for engaging the cartridge when the cartridge is in an operative relationship with the print head assembly, for moving the ribbons past the associated impact print heads;
(e) a signal source for providing electronic signals which represent, on a point-by-point basis, the color content of the characters and/or drawings to be printed;
(f) indexing means for enabling each impact print head to sequentially mark the media at pre-selected positions; and,
(g) control means responsive to said signal source for selectively causing said indexing means to actuate the impact print heads at each preselected position along the printing direction depending upon the color content of said electronic signals, thereby causing a preselected colored combination mark on the media.

11. An impact printer for producing color characters and drawings on a media, comprising:
(a) a print head assembly including a plurality of independently actuable impact print heads serially arranged along a printing direction,
  each of said print heads including actuable pin means;
(b) means, disposed on the print head assembly, for supporting a removable cartridge, having a plurality of separate different colored inked ribbons, in an operative relationship with the print head assembly, each separate ribbon being disposed between an associated impact print head and the media when the cartridge is in an operative relationship with the print head assembly;
(c) means for causing relative movement between the print head assembly and the media along the printing direction with each of said impact print heads being capable of marking the media over coextensive areas of the media;
(d) capstan means, for engaging the cartridge when the cartridge is in an operative relationship with the print head assembly, for moving the ribbons past the associated print heads;
(e) a signal source for providing electronic signals which represent, on a point-by-point basis, the color content of the characters and/or drawings to be printed;
(f) indexing means for enabling each of said print heads to sequentially mark the media at preselected positions; and,
(g) control means responsive to said signal source for selectively causing said indexing means to actuate the print head pin means at each preselected position along the printing direction depending upon the color content of said electronic signals, thereby causing a preselected colored combination mark on the media, said control means including pulse modulation means for controlling the impact force of each of said print head pin means to cause intensity modulation of the colored marks.

12. An impact printer for producing color characters and drawings on a media, comprising:
(a) a print head assembly including a plurality of independently actuable impact print heads serially arranged along a printing direction,
  each of said print heads including actuable pin means;
(b) means, disposed on the print head assembly, for supporting a removable cartridge, having a plurality of separate different colored inked ribbons, in an operative relationship with the print head assembly, each separate ribbon being disposed between an associated impact print head and the media when the cartridge is in an operative relationship with the print head assembly;
(c) means for causing relative movement between the print head assembly and the media along the printing direction such that each of said impact print heads can strike the same positions on said media;
(d) capstan means, for engaging the cartridge when the cartridge is in an operative relationship with the print head assembly, for moving the ribbons past the associated print heads;
(e) a signal source for providing electronic signals which represent, on a point-by-point basis, the color content of the characters and/or drawings to be printed;
(f) indexing means for enabling each of said print heads to sequentially mark the media at preselected positions;
(g) control means responsive to said signal source for selectively causing said indexing means to actuate the print head pin means at each preselected position along the printing direction depending upon the color content of said electronic signals, thereby causing a preselected colored combination mark on the media, said control means including pulse modulation means for controlling the impact force of each print head pin means to cause intensity modulation of the colored marks, and means responsive to a color signal for varying the impact force of each print head in order to maintain color intensity; and,
(h) feedback means for monitoring the intensity of preselected color marks and generating a color signal corresponding thereto.

13. An impact printer for producing color characters and drawings on a media, comprising:
(a) a print head assembly having a plurality of independently actuable, serially arranged impact print heads;

(b) a removable cartridge including a plurality of different colored ribbons, said ribbons being in a serial arrangement and each having a loop portion disposed between an associated print head and the media to be printed on when the cartridge is disposed in an operative relationship with the print head assembly;

(c) means for causing relative movement between the print head assembly and the media such that each of said impact print heads is capable of impacting the same print positions;

(d) means for moving the ribbon loop portions past the associated print heads;

(e) a signal source for providing electronic signals which represent, on a point-by-point basis, the color content of the characters and/or drawings to be printed;

(f) indexing means for enabling each print head to sequentially mark the media at preselected positions; and, (g) control means responsive to said signal source for selectively causing said indexing means to actuate the print heads at each preselected position depending upon the color content of said electronic signals, thereby causing a preselected colored combination mark on the media.

14. The impact printer of claim 13, wherein the means for moving the ribbon loop portions past the associated print heads includes a drive capstan disposed on said print head assembly and drive means for driving each ribbon disposed within the cartridge, said drive means being configured for engagement with the capstan when the cartridge is disposed in an operative relationship with the print head assembly.

* * * * *